United States Patent [19]

Iwata

[11] 4,330,448
[45] May 18, 1982

[54] PROCESS FOR PRODUCING CYCLOPENTADIENE RESIN

[75] Inventor: Riso Iwata, Tokyo, Japan

[73] Assignee: Nippon Zeon Co., Ltd., Tokyo, Japan

[21] Appl. No.: 188,106

[22] Filed: Sep. 17, 1980

[30] Foreign Application Priority Data

Sep. 26, 1979 [JP] Japan .................... 54-123611

[51] Int. Cl.$^3$ ............................ C08F 2/02; C08F 2/06
[52] U.S. Cl. .............................. 526/79; 526/283; 526/308
[58] Field of Search ............. 526/79, 308; 260/23 CP, 260/23.7 C

[56] References Cited

U.S. PATENT DOCUMENTS 4,146,691 3/1979 Wada et al. .................... 526/308

Primary Examiner—Stanford M. Levin
Attorney, Agent, or Firm—Sherman & Shalloway

[57] ABSTRACT

In a process for producing a cyclopentadiene resin having a regulated softening point which comprises heat-copolymerizing a cyclopentadiene monomer and a comonomer copolymerizable therewith, the improvement which comprises polymerizing (A) a monomeric mixture having a low content of a cyclopentadiene monomer, then adding (B) a cyclopentadiene monomer or (C) a monomeric mixture having a high content of a cyclopentadiene monomer, and continuing the polymerization.

15 Claims, No Drawings

PROCESS FOR PRODUCING CYCLOPENTADIENE RESIN

This invention relates to a process for producing a cyclopentadiene resin having a regulated softening point. More specifically, this invention relates to a process for regulating the softening point of a cyclopentadiene resin by using two starting monomeric mixture containing a cyclopentadiene monomer in different concentrations.

A method is well known for obtaining resinous polymer by heat copolymerizing a cyclopentadiene monomer such as cyclopentadiene and dicyclopentadiene and a comonomer copolymerizable therewith. This known method has the advantage that the resins can be very efficiently produced because no catalyst is used as contrasted with cationic polymerization which requires a catalyst, but suffers from the defect that the softening point of the resulting resin is too high, and it is necessary to control its softening point with a proper range by some means.

For this purpose, there have been proposed a method comprising maintaining the concentration of the cyclopentadiene monomer in the monomeric mixture at a low value, a method comprising decreasing the polymerization temperature, and a method comprising maintaining the polymerization conversion low. The reduced concentration of the cyclopentadiene monomer, however, adversely affects the properties of the resulting resin. Further, when the polymerization temperature is decreased, a waxy polymer tends to form. The reduction of the polymerization conversion, on the other hand, results in a decrease in production efficiency. Accordingly, none of these known methods are entirely satisfactory.

It is an object of this invention therefore to provide a process for efficiently producing a cyclopentadiene resin having a controlled softening point without varying the proportions of monomers.

The present inventors have made investigations in order to achieve this object, and found that the softening point of a cyclopentadiene resin can be regulated with good efficiency without changing the proportion of monomers when a specified polymerization method is employed.

Thus, according to this invention, there is provided a process for producing a cyclopentadiene resin having a regulated softening point by heat co-polymerizing a cyclopentadiene monomer and a comonomer copolymerizable therewith which comprises first polymerizing a monomeric mixture (A) having a low content of a cyclopentadiene monomer, then adding (B) a cyclopentadiene monomer or (C) a monomeric mixture having a high content of a cyclopentadiene monomer, and continuing the polymerization.

In the process of this invention, a cyclopentadiene monomer and a comonomer copolymerizable therewith are used as monomeric components. Specific examples of the cyclopentadiene monomer are cyclopentadiene, methylcyclopentadiene, and the dimers, trimers and codimers thereof. Specific examples of the comonomer include monoolefins such as ethylene, propylene, butene, pentene, styrene and α-methylstyrene; conjugated diolefins such as 1,3-butadiene, isoprene and 1,3-pentadiene; vinyl compounds having a polar group such as vinyl acetate, vinyl propionate, acrylic acid esters, methacrylic acid esters, acrylonitrile, acrolein, allyl alcohol and 1,4-butenediol; unsaturated glyceride oils such as linseed oil, tung oil and dehydrated castor oil.

The proportions of the monomeric components may be selected properly depending upon the properties required of the resulting resin. Usually, 40 to 90% by weight of the cyclopentadiene monomer and 60 to 10% by weight of the comonomer are used.

In the present invention, the aforesaid monomeric components are used as a monomeric mixture having a low content of a cyclopentadiene monomer [to be referred to as a monomeric mixture [A] and a cyclopentadiene monomer alone [to be abbreviated as a monomer (B)] or a monomeric mixture having a high content of a cyclopentadiene monomer [to be referred to as a monomeric mixture (C)]. The important requisite of the process of this invention is that the monomeric mixture (A) is first polymerized almost completely, and then the monomer (B) or the monomeric mixture (C) is added, and the polymerization is continued. The proportion of the monomeric mixture (A) in the entire monomeric components is usually 35 to 85% by weight, preferably 40 to 80% by weight. If this proportion is excessively smaller or larger, the effect of controlling the softening point of the resin is reduced. The monomeric mixture (A) consists of 40 to 85% by weight, preferably 45 to 80% by weight, of the cyclopentadiene monomer and 60 to 15% by weight, preferably 55 to 20% by weight, of the comonomer. With increasing concentration of the cyclopentadiene monomer, formation of a by-product gel-like material tends to occur, and with decreasing concentration of the cyclopentadiene monomer, the reactivity of the monomeric mixture decreases and an oily material tends to form as a by-product.

The monomeric mixture (C) may contain the same or different comonomer as or from the comonomer in the monomeric mixture (A) if it has a higher concentration of the cyclopentadiene monomer than the monomeric mixture (A). However, to control the softening point of the resulting resin with good efficiency, it is preferred that the concentration of the cyclopentadiene monomer of the mixture (A) is at least 10% by weight lower than that of the monomeric mixture (C). For the same reason, the concentration of the cyclopentadiene monomer of the monomeric mixture (A) is at least 10% by weight lower (i.e., not more than 90% by weight) than the concentration of the cyclopentadiene monomer in the monomer (B) (i.e., 100% by weight).

The heat copolymerization reaction in this invention is carried out in a customary manner except as noted above. Specifically, the polymerization reaction is carried out at a temperature of 230° to 300° C., preferably 250° to 280° C., in an atmosphere of an inert gas such as nitrogen or argon in the presence or absence of a solvent which is inert to the polymerization reaction (i.e., benzene, toluene, xylene and kerosene). The mode of polymerization may be batchwise or continuous. The polymerization time is 0.5 to 6 hours, preferably 1 to 4 hours, both in the polymerization of the monomeric mixture (A) and in the polymerization after the addition of the monomer (B) or the monomeric mixture (C).

The process of this invention can afford a cyclopentadiene resin having a regulated softening point with good efficiency without decreasing its yield and forming a waxy by-product. The resulting resin usually has a softening point of 50° to 180° C. The resin is useful in the fields of paints, adhesives, inks, and rubber compounding agents as is the case with similar resins obtained by conventional processes.

The following Examples illustrate the present invention further. All parts and percentages in these examples are by weight.

EXAMPLE 1

A 1-liter autoclave was charged with 420 g of a monomeric mixture (A) having each of the constituent proportions shown in Table 1, and it was polymerized at 260° C. for 3 hours in an atmosphere of nitrogen. Then, 180 g of a monomer (B) or a monomeric mixture (C) having each of the constituent proportions shown in Table 1 was fed into the autoclave, and the polymerization was continued at 260° C. for 2 hours. After the polymerization, the polymerization product was distilled at 230° C. to remove the unreacted monomers. Thus, a cyclopentadiene resin was obtained.

For comparison 600 g of a monomeric mixture having the same constituent proportions of the total of the monomeric mixture (A) and the monomer (B) or monomeric mixture (C) was charged at a time into an autoclave, and polymerized at 260° C. for 5 hours in an atmosphere of nitrogen. The polymerization product was distilled to afford a cyclopentadiene resin.

The results are shown in Table 1.

TABLE 1

| Run No. | | Comparison 1-1 | Invention 1-2 | 1-3 | Comparison 1-5 | Invention 1-5 | Comparison 1-6 | Invention 1-7 |
|---|---|---|---|---|---|---|---|---|
| Proportions of the entire monomers (%) | DCP (*1) | 70 | 70 | 70 | 80 | 80 | 85 | 85 |
| | VAC (*2) | 30 | 30 | 30 | 20 | 20 | 15 | 15 |
| Proportions of the monomers in the mixture (A) (%) | DCP | — | 63 | 60 | — | 75 | — | 78.5 |
| | VAC | — | 37 | 40 | — | 25 | — | 21.5 |
| Proportions of the monomer (B) or the monomeric mixture (C) (%) | DCP | — | 85 | 90 | — | 91.7 | — | 100 |
| | VAC | — | 15 | 10 | — | 8.3 | — | 0 |
| Softening point (°C.) | | 107 | 83 | 65 | 147 | 115 | 185 | 140 |
| Color (Gardner; GN) | | 6 | 6 | 6–7 | 4 | 4–5 | 4 | 4 |
| Yield of the resin (%) | | 76 | 75 | 77 | 83 | 83 | 85 | 86 |

(*1): Dicyclopentadiene;
(*2): vinyl acetate.

It is seen from Table 1 that according to the process of this invention, the softening point of the cyclopentadiene resin can be controlled with good efficiency without varying the constituent proportions of monomers and without reducing the polymerization conversion.

EXAMPLE 2

Cyclopentadiene resins were produced in the same way as in Example 1 except that monomeric mixtures (A) and monomeric mixtures (C) having the constituent proportions shown in Table 2 were used. The results are shown in Table 2.

TABLE 2

| Run No. | | | Comparison 2-1 | Invention 2-2 | 2-3 | 2-4 |
|---|---|---|---|---|---|---|
| Proportions of the entire monomers (%) | | DCP | 70 | 70 | 70 | 70 |
| | | VAC | 30 | 30 | 30 | 30 |
| Monomeric mixture (A) | Proportions (%) | DCP | — | 65 | 65 | 62.5 |
| | | VAC | — | 35 | 35 | 37.5 |
| | Ratio (%) based on the entire monomers | | — | 80 | 60 | 40 |
| Monomeric mixture (C) | Proportions (%) | DCP | — | 90 | 77.5 | 75 |
| | | VAC | — | 10 | 22.5 | 25 |
| | Ratio (%) based on the entire monomers | | — | 20 | 40 | 60 |
| Difference (%) in DCP content between the monomeric mixture (A) and the monomeric mixture (C) | | | — | 25 | 12.5 | 12.5 |
| Softening point (°C.) | | | 107 | 93 | 85 | 95 |
| Color (Gardner; GN) | | | 6 | 6 | 6–7 | 6 |
| Yield of the resin (%) | | | 76 | 77 | 76 | 76 |

It is seen from the results shown in Table 2 that the softening point of the cyclopentadiene resin can be controlled even when the proportions of the monomeric mixture (A) and the monomeric mixture (C) were varied.

What we claim is:

1. In a process for producing a cyclopentadiene resin having a regulated softening point which comprises heat-copolymerizing a cyclopentadiene monomer and a comonomer copolymerizable therewith, the improvement which comprises polymerizing (A) a monomeric mixture of a cyclopentadiene monomer for about 0.5 to about 6 hours at a temperature of about 230° C. to about 300° C., then adding (B) a cyclopentadiene monomer or (C) a monomeric mixture of a cyclopentadiene monomer, wherein the content of the cyclopentadiene monomer in the monomeric mixture (A) is at least 10% by weight lower than that of the monomer (B) or the cyclopentadiene monomer of the monomeric mixture (C), and continuing the polymerization of an additional 0.5 to 6 hours at a temperature of about 230° C. to about 300° C., to obtain said cyclopentadiene resin.

2. The process of claim 1 wherein the proportion of the monomeric mixture (A) is 35 to 85% by weight based on the monomers in mixture (A) and (B) or in mixture (A) and (C).

3. The process of claim 1 wherein said monomeric mixture (A) is a mixture of 40 to 85% by weight of a cyclopentadiene monomer and 60 to 15% by weight of a comonomer.

4. The process of claim 1 wherein the cyclopentadiene monomer is cyclopentadiene, methyl cyclopentadiene, or a dimer, trimer or codimer thereof.

5. The process of claim 1 wherein the comonomer is a monolefin, a conjugated diolefin, a vinyl compound having a polar group, or an unsaturated glyceride oil.

6. The process of claim 1 wherein the cyclopentadiene monomer (B) is added.

7. The process of claim 1 wherein the monomeric mixture (C) is added.

8. The process of claim 1 wherein the cyclopentadiene resin comprises 40 to 90% by weight of the cyclopentadiene monomer and 60 to 10% by weight of the comonomer.

9. A process for producing a cyclopentadiene resin having a regulated softening point which comprises
   (1) heat copolymerizing at a temperature of about 230° to 300° C. for about 0.5 to 6 hours (A) a monomeric mixture of 40 to 85% by weight of a cyclopentadiene monomer and 60 to 15% by weight of a comonomer copolymerizable therewith;
   (2) adding to the product of step (1), either (B) a cyclopentadiene monomer or (C) a monomeric mixture of a cyclopentadiene monomer and a comonomer copolymerizable therewith, wherein the concentration of the cyclopentadiene monomer in monomeric mixture (C) is higher than the concentration of the cyclopentadiene monomer in the monomeric mixture (A) and wherein the proportion of the monomer mixture (A) is 35 to 85% by weight biased on the total monomers in steps (1) and (2); and
   (3) continuing the heat-copolymerizing for an additional about 0.5 to 6 hours at a temperature of about 230° to 300° C. to obtain said cyclopentadiene resin.

10. The process of claim 9 wherein in step (2) the cyclopentadiene monomer (B) is added to the product of step (1).

11. The process of claim 10 wherein the content of the cyclopentadiene monomer in the monomeric mixture (A) is at least 10% by weight lower than that of the monomer (B).

12. The process of claim 9 wherein in step (2) the monomeric mixture of a cyclopentadiene monomer and a comonomer copolyermizable therewith (C) is added to product of step (1).

13. The process of claim 12 wherein the content of the cyclopentadiene monomer in the monomer mixture (A) is at least 10% by weight lower than that of the cyclopentadiene monomer in the monomeric mixture (C).

14. The process of claim 9 wherein the cyclopentadiene monomer is cyclopentadiene, methyl cyclopentadiene, or a dimer, trimer or codimer thereof; and wherein the comonomer is a monolefin, a conjugated diolefin, a vinyl compound having a polar group, or an unsaturated glyceride oil.

15. The process of claim 9 wherein the monomeric mixture (A) comprises 45 to 80% by weight of the cyclopentadiene monomer and 55 to 20% by weight of the comonomer copolymerizable therewith.

* * * * *